(No Model.)　　　　F. M. & R. E. MONGER.　　　2 Sheets—Sheet 1.
AUTOMATIC BELT SHIFTER.

No. 304,273.　　　　　　　Patented Aug. 26, 1884.

WITNESSES
Phil C. Dieterich
T. R. Keyworth

INVENTORS:
Francis M. Monger
Robt. E. Monger
by T. S. Alexander, Attorney (No Model.) 2 Sheets—Sheet 2.
F. M. & R. E. MONGER.
AUTOMATIC BELT SHIFTER.
No. 304,273. Patented Aug. 26, 1884.
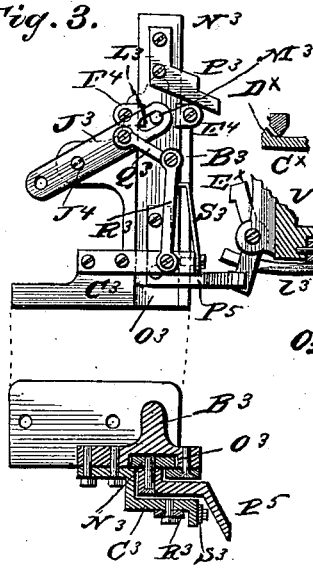
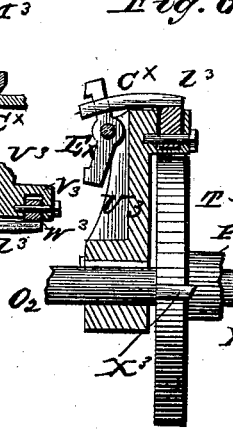
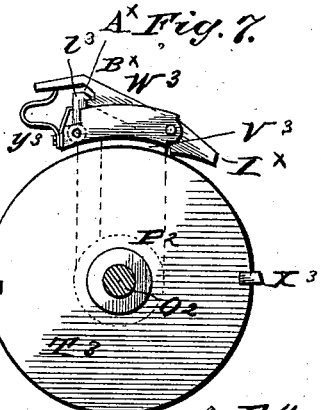
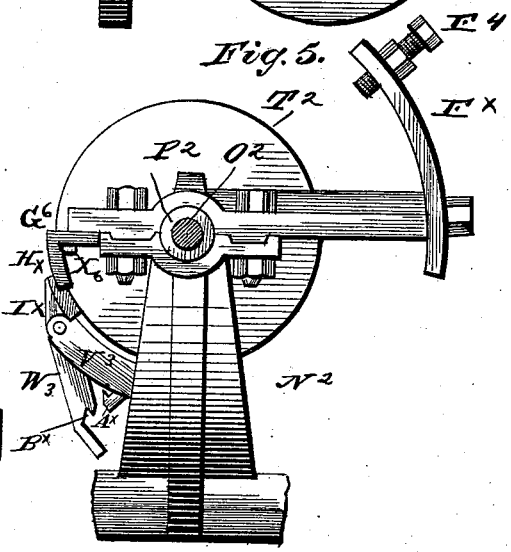
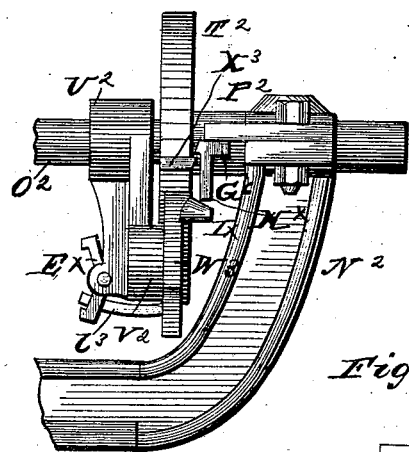
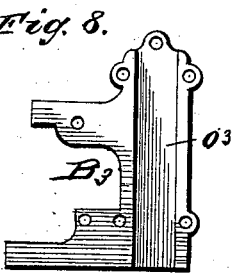
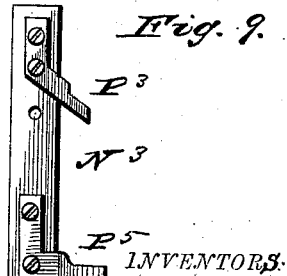
WITNESSES
Phil C. Dietrich
T. R. Keyworth
INVENTORS
Francis M. Monger
Robt. E. Monger
by T. M. Alexander
Attorney

UNITED STATES PATENT OFFICE.

FRANCIS MARIAN MONGER AND ROBERT EMERSON MONGER, OF CLEVELAND, ASSIGNORS TO THEMSELVES AND CALVARY G. SAMPLES, OF GREENFIELD, INDIANA.

AUTOMATIC BELT-SHIFTER.

SPECIFICATION forming part of Letters Patent No. 304,273, dated August 26, 1884.

Application filed May 16, 1884. (No model.)

*To all whom it may concern:*

Be it known that we, F. M. MONGER and R. E. MONGER, of Cleveland, in the county of Hancock and State of Indiana, have invented certain new and useful Improvements in Automatic Belt-Shifters; and we do hereby declare that the following is a full, clear, and exact description thereof, reference being had to the accompanying drawings, and to the letters of reference marked thereon, which form part of this specification.

Figure 1:
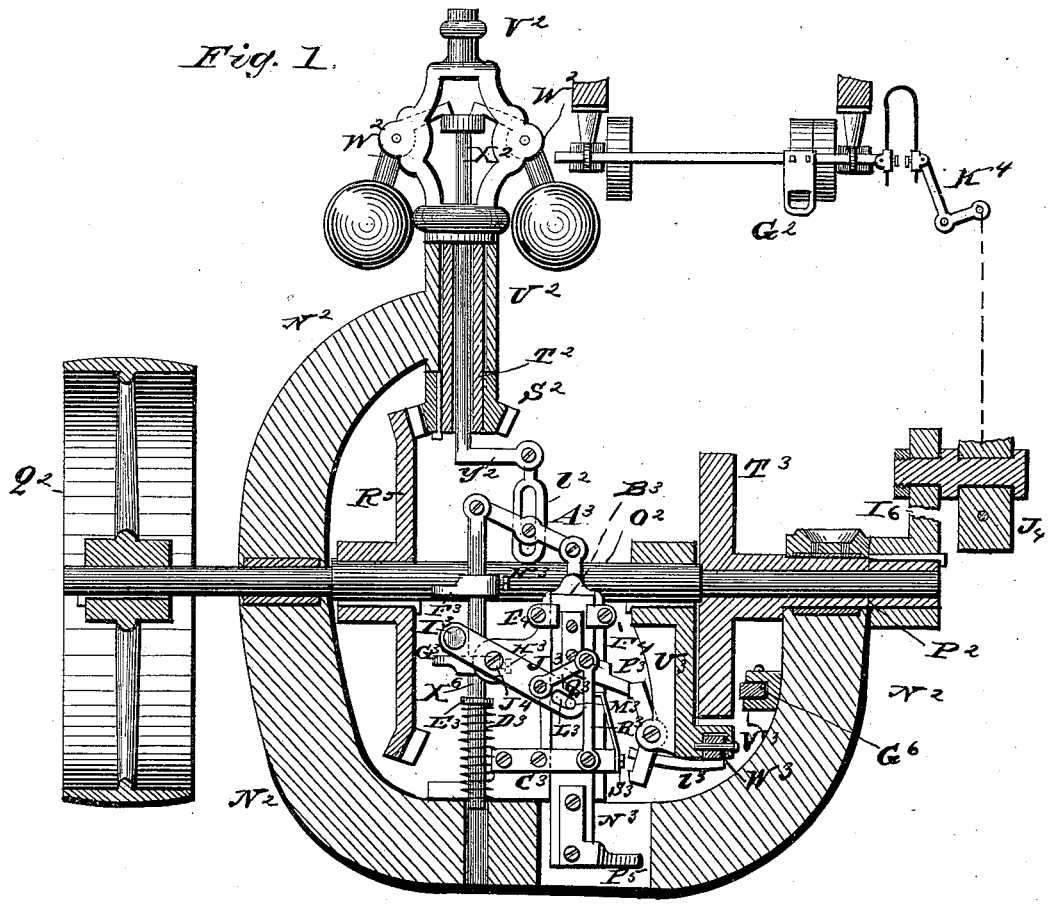
Figure 2:
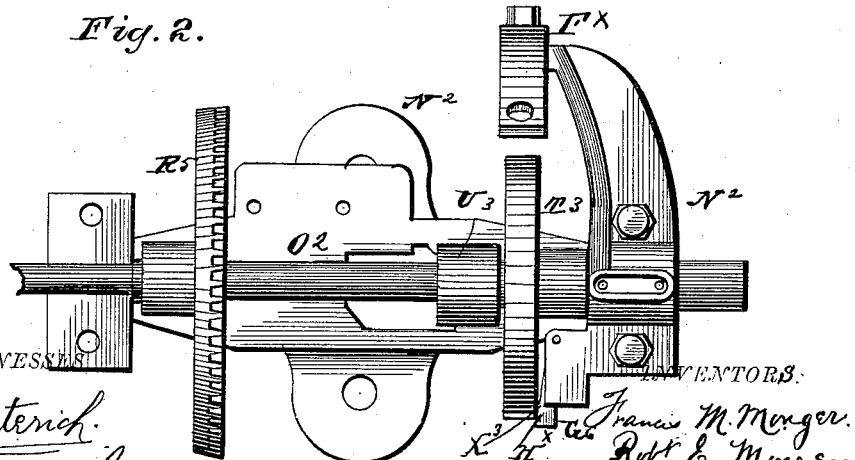

Figure 1 is a vertical sectional view of our improved automatic belt-shifter. Fig. 2 is a plan view of a portion of the same. Figs. 3, 4, 5, 6, 7, 8, and 9 are details.

This invention has for its objects the application of a governor, driven by a steam-engine or other prime motor, to a thrashing-machine, or to any other machine of a similar kind where it is desired to gage the speed or to stop the motion of the machine when the speed exceeds that for which it is set.

The nature of our invention consists in the employment of certain novel devices, which will be hereinafter fully explained, whereby we are able to shift the belt automatically should the speed of the machine exceed the feed thereof, thus gaging the motion of the machine to the required feed, and preventing the machine from clogging, as will be fully understood from the following description when taken in connection with the annexed drawings.

$N^2$ designates a frame suitably adapted to support the governing mechanism, and which is intended to be rigidly secured in any convenient position upon the frame of a thrashing-machine feeder or any other like machine. Said mechanism comprises a transverse or counter shaft, $O^2$, one end of which has its bearing in the frame $N^2$, and the other end of which is journaled in a sleeve, $P^2$, which is journaled in the opposite side of said frame. One of the projecting ends of shaft $O^2$ carries a pulley, $Q^2$, to which motion is communicated by a belt from the cylinder-shaft of a thrashing-machine. Shaft $O^2$ carries a rigidly-attached bevel-wheel, $R^5$, which engages with a pinion, $S^2$, upon the lower end of a sleeve, $T^2$, journaled in a bracket, $U^2$, of the frame $N^2$, and constituting the vertical shaft of a ball-governor, $V^2$. The governor-arms $W^2$ consist of bell-crank levers, the inner ends of which bear on the upper end of a stem, $X^2$, sliding vertically in the sleeve $T^2$, so that as the governor attains speed the stem $X^2$ will be proportionately depressed. The lower end of the stem $X^2$ has a laterally-extending arm, $y^2$, which is connected by a pivoted link, $l^2$, with a lever, $A^3$, having its fulcrum at the upper end of an upright, $B^3$, secured in the frame $N^2$, held by a guide, $F^3$. $D^3$ is a spring coiled around the lower portion of a vertically-movable rod, $X^6$, and bearing against a collar, $E^3$, on this rod, which latter is thereby forced in an upward direction. The upper portion of the rod $X^6$ is provided with two collars, $F^3$ and $G^3$, adjustable by means of set-screws $H^3$, and into the space between the said collars extends a stud, $I^3$, formed on one end of a lever, $J^3$, fulcrumed at $J^4$ upon the upright $B^3$. The other end of the lever $J^3$ is provided with a slot, $L^3$, fitting on a stud, $M^3$, upon the face of a bar, $N^3$, which latter slides vertically in a groove, $O^3$, in the face of the uprights $B^3$. The bar $N^3$ is provided near its upper and lower ends with laterally-extended beveled arms $P^3$ and $P^5$. The face of the lever $J^3$ is connected by a pivoted rod, $Q^3$, with an arm, $R^3$, which is pivoted to the face of the guard $C^3$ and acted upon by a spring, $S^3$, which latter serves to retain the parts fixedly in any position to which they may be adjusted. The inner end of the sleeve $P^2$ has a fixed disk, $T^3$, adjoining which is a radial arm, $U^3$, fixed on the shaft $O^2$, and having a lateral projection, $V^3$, extending over the periphery of the disk $T^3$.

Pivoted to the projection $V^3$ is a dog or latch, $W^3$, capable of engaging projections $X^3$ upon the periphery of said disk, with which it is held in contact by the action of a spring, $y^3$, suitably arranged at the rear end of the said latch.

$l^3$ is a trigger pivoted transversely to the projection $V^3$, and having a tooth, $A^\times$, engaging a notch, $B^\times$, in the rear end of the latch $W^3$. The trigger $l^3$ has a laterally-extending arm, $C^\times$, the face of which is provided with a triangular projection, $D^\times$, engaging one of the arms of a lever, $E^\times$, pivoted to the side of the arm $U^3$. It will be observed that by moving the lever $E^\times$ in either direction the trigger $l^3$ will be operated and the latch tripped thereby, bringing its front end down against the periphery of the disk T and engaging one of the teeth or projections, $X^3$, upon the periphery of said disk, which will thus be caused to make part of a revolution.

$F^\times$ is a segmental arm extending from the front part of the frame and provided with a set-screw, $F^4$, adapted to bear against the rear end of the latch, so as to release the same from contact with the periphery of the disk $T^3$ and throw it into engagement with the trigger $l^3$ when the disk has made a half-revolution.

$G^6$ is a lever which is pivoted to the frame $N^2$, and provided with a shoulder, $H^\times$, and actuated by a suitably-arranged spring, so as to engage lateral extensions of the teeth or projections $X^3$, thus forming a rest, the function of which is to retain the disk $T^3$ in any position to which it may be adjusted. This ever or rest $G^6$ is operated and released from the disk $T^3$, so as to allow the latter to start when required, by the action of a beveled stud or projection, $I^\times$, extending laterally from the latch $W^3$.

The outer end of the sleeve $P^2$ on shaft $O^2$ is provided with a fixed crank, $I^6$, connected by a pitman or rod, $J^4$, with a belt-crank lever, $K^4$, by which the belt-shifter $G^2$ is operated.

The operation is as follows: When the machine—say, for instance, a thrashing-machine—is started, motion is imparted from the thrashing-cylinder shaft to the shaft $O^2$, and thence through the spur-wheel $R^5$ and pinion $S^2$ to the governor. As the latter attains speed the stem $X^2$ is depressed, thus causing the link $l^2$ to operate the lever $A^3$, which latter serves to depress the stem $X^6$ against the tension of the spring $D^3$. Collar $F^3$ of stem $X^6$ engages the stud $I^3$ of lever $J^3$, which lifts or elevates the sliding bar $N^3$, the projection $P^5$ of which will strike the lever $E^\times$ and operate the trigger $l^3$ when the arm U reaches the said projection $P^5$ in the course of the revolution of the shaft $O^2$. The latch $W^3$ is then thrown into engagement with one of the teeth $X^3$ of the disk $T^3$, which latter will make a half-revolution, it having first been released from the lever-catch $G^4$ by the action of the stud $I^\times$, as above set forth. When the half-revolution of the disk $T^3$ has been completed, the latch $W^3$ engages the set-screw $G^\times$ of arm $F^\times$, by the action of which it is thrown out of engagement with the periphery of disk $T^3$, the revolution of which then ceases. The effect of this half-revolution of the disk $T^3$ and crank $I^6$ has been to operate the belt-shifter $G^2$, and to throw the belt upon the fixed pulley $F^2$ of the shaft, thus starting the thrashing mechanism. When the speed slackens, a reverse operation takes place. The stem $X^6$ is then forced upward by the action of spring $D^3$, the bar $N^3$ is lowered, bringing its arm $P^3$ in contact with lever $E^4$, operating the latter and tripping the latch $W^3$, and causing disk $T^3$ again to make a half-revolution, thus returning the crank $I^6$ to its original position and causing the belt-shifter $G^2$ to restore the belt to the loose pulley of the shaft E, thus stopping the feed mechanism of the thrashing-machine.

Having described our invention, we claim as new—

1. The combination, with the main frame, of a belt-wheel shaft bearing a beveled spur-wheel, a governor constructed as described, a vertically-movable governor-stem, a spring-actuated dog and catch on said arm, a stationary releasing device, a disk on the shaft of arm $I^6$, provided with projections on its periphery, and mechanism, as described, connected to the governor-stem, for actuating the said dog to cause it to engage with said disk, and a belt-shifter connected to arm $I^6$, all constructed and adapted to operate substantially as and for the purposes described.

2. The combination, with the vertically-movable governor-stem provided on its lower end with an arm, $y^2$, of a link, $l^2$, a rocking lever connected at one end to a slide and at the other end to a vertically-movable spring-actuated stem, $X^6$, levers $J^3$ $M^3$ $P^3$, a spring-actuated dog on the arm of the main shaft, a disk on the shaft of arm $I^6$, and belt-shifting devices connected to said arm, all constructed substantially as described.

3. In combination with a centrifugal governor and the system of levers and stems described, the lever $P^3$, projection $P^5$ on the sliding bar $N^3$, lever $E^\times$, trigger $l^3$, and latch $W^3$ on arm $U^3$, the disk on the shaft of arm $I^6$, and a belt-shifter, all constructed and adapted to operate substantially as described.

4. The U-shaped spring between the bell-crank $i$ and the belt-wheel shaft E, in combination with mechanism, as described, connected to a governor for actuating the belt-shifter, substantially as described.

5. The combination of the governor-stem, actuated as described, the main belt-wheel-shaft gearing, with the rotary governor sleeve and bearing, an arm provided with a spring-actuated dog and catch therefor, the disk on the shaft of the arm $I^6$, provided with projections, the spring-actuated stem X, provided with adjustable collars, and connected by a link and lever to the arm of the governor-stem, the part $B^3$, the levers $J^3$ $M^3$ $P^3$, slide $N^3$, trigger $l^3$, a dog on arm $U^3$, and a releasing device on the main frame, all constructed and adapted to operate substantially in the manner and for the purposes described.

6. The combination, with a belt-shifter, of a governor and intermediate devices, as described, which automatically operate to adjust said shifter, all constructed and adapted to operate substantially as specified.

In testimony that we claim the foregoing as our own we affix our signatures in presence of two witnesses.

FRANCIS MARIAN MONGER.
ROBERT EMERSON MONGER.

Witnesses:
IRA COLLINS,
ISAIAH ALBERT CURREY.